United States Patent

Smith

[15] 3,660,046
[45] May 2, 1972

[54] QUENCHING APPARATUS FOR A HIGH PRESSURE SYNTHESIS GAS PROCESS

[72] Inventor: Randlow Smith, Houston, Tex.
[73] Assignee: Texaco Inc., New York, N.Y.
[22] Filed: Feb. 5, 1970
[21] Appl. No.: 8,791

[52] U.S. Cl..................................23/284, 48/214, 48/215, 261/74, 23/252 A
[51] Int. Cl.......................................................B01d 47/02
[58] Field of Search.............261/118, 74, 128, 149; 48/214, 48/215, 211; 23/284

[56] References Cited

UNITED STATES PATENTS 3,322,412  5/1967  Yurko et al..........................261/128
3,414,247  12/1968  Sama..................................48/214 UX Primary Examiner—Morris O. Wolk
Assistant Examiner—R. E. Sewin
Attorney—Thomas H. Whaley and Carl G. Ries

[57] ABSTRACT

A combined quenching and scrubbing structure for use in a synthesis gas process that employs high pressure and temperature. There is a thin walled quenching vessel that is constructed of high alloy steel to withstand the corrosive effects. It is contained inside of a low alloy steel spherical container that is thick walled to withstand the high pressure. An outlet from the quenching vessel has an orifice scrubber therein and both are located inside the spherical container.

8 Claims, 1 Drawing Figure

PATENTED MAY 2 1972 3,660,046
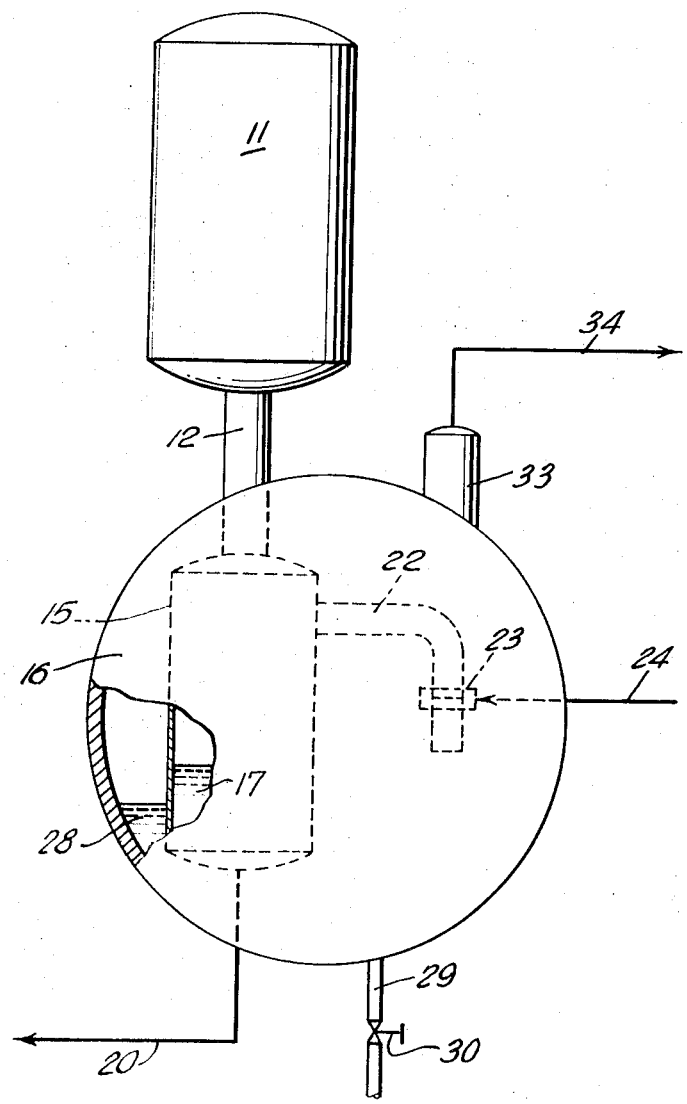

QUENCHING APPARATUS FOR A HIGH PRESSURE SYNTHESIS GAS PROCESS

BACKGROUND OF THE INVENTION

1. Field of the Invention

This invention relates to apparatus for use in chemical processes in general. More specifically, it concerns a particular combination of apparatus for use in connection with a high pressure synthesis gas process.

2. Description of the Prior Art

In connection with hydrocarbon processes such as one relating to synthesis gas generation which includes a partial oxidation unit, there has been an increase in the temperatures and pressures involved. The result has been that problems of corrosion have arisen. These pertain to conditions involving pressures above 600 pounds per square inch and particularly where the pressures are from 1,200 to 3,500 pounds per square inch. Such conditions relate to the construction of apparatus that is used for quenching the high temperature synthesis gas.

Attempts to control the corrosion problems by injection of a neutralizing agent such as ammonia were not satisfactory. It was found that raising the pH in the quench section had an adverse effect on the carbon settling.

Another approach to the corrosion problems might have been the use of alloys capable of withstanding low pH's. However, there are practical problems in cladding the heavy walled steel vessel that is involved. Furthermore, if the vessel were to be fabricated from such an alloy, it would be practically prohibitive in cost due to the high pressures involved. In addition, an object of the invention is to provide a combination that can eliminate some expensive piping and other equipment that was formerly used in the carbon scrubbing system.

SUMMARY OF THE INVENTION

Briefly, the invention concerns a high pressure synthesis gas process and includes apparatus for quenching said synthesis gas. It relates to the improvement which comprises in combination a thin walled quench vessel for receiving and quenching said high pressure gas, and a thick walled container surrounding said quench vessel and containing most of said high pressure therein.

Again briefly, the invention relates to a high pressure synthesis gas process wherein high temperatures in the range of about 1,800° to 3,500° F. and high pressures of about 1,200 to 3,500 pounds per square inch are involved. Said process includes apparatus for quenching said synthesis gas. The invention concerns the improvement which comprises in combination a thin walled quench vessel for receiving and quenching said synthesis gas, said quench vessel being constructed of a high alloy steel for withstanding said synthesis gas fluids having a pH in the range of about 3 to 9. The improvement also comprises a thick walled container surrounding said quench vessel, said container being spherical and being constructed of a low alloy steel selected for withstanding substantially all of said high pressure. The improvement additionally comprises a gas outlet from said quench vessel, including a water scrubber therein. The said outlet and scrubber are contained inside of said container.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

The FIGURE of the drawing is a schematic illustration indicating the combination of elements according to the invention.

DESCRIPTION OF THE PREFERRED EMBODIMENT

The invention relates to a combination of structural elements that are employed in a process such as one for the production of synthesis gas from liquid hydrocarbons, by reaction with oxygen and steam. It includes a section known as a partial oxidation unit that includes a quench and carbon scrubbing section. In such a process the tendency has been to operate under increased temperatures and pressures so that the pressures may be as high as 2000 pounds per square inch or more and the temperatures may be in the range of about 1,800° to 3,500° F. An example of such process is described in U.S. Pat. No. 3,232,727 issued Feb. 1, 1966 to F. C. Guptill, Jr. et al.

Relevant aspects of the process relate to conditions that are obtained at the output of the synthesis gas generator. It involves quenching the hot synthesis gas to reduce its temperature rapidly. As this takes place there is a removal of entrained carbon and the production of steam which may be useful in subsequent operations. Such carbon removal is partially accomplished in the quench vessel where the hot gases are cooled in a water bath and the carbon that settles out is removed by drawing off the carbon-in-water slurry to a nearby decanter. The hot gases are then transmitted from the quench vessel, and remaining carbon is removed. The latter is ordinarily carried out in a number of steps that may include additional water scrubbing, etc., all of which has heretofore involved expensive piping.

In carrying out the foregoing process it has been found that the quench vessel and the scrubbing system become practically prohibitive in cost by reason of the requirements for containing the high pressure and concomitant corrosive conditions. Thus, in order to construct a quench vessel that can withstand the corrosive effects under the pressure conditions imposed, the cost becomes quite uneconomical and thus not feasible. However, by improving the structure according to this invention such difficulties are overcome.

An arrangement of apparatus according to the invention is schematically illustrated in the drawing. There is a synthesis gas generator 11 that feeds the hot gases from the generator through an outlet pipe 12 into a thin walled quench vessel 15. This quench vessel 15 is contained inside of a spherical thick walled container 16 in a pressure-tight manner. Thus, the high pressures of the hot gases that are coming from the generator 11 are contained within the container 16.

Container 16 is preferably constructed of steel having adequate thickness. However, it need only have sufficient alloy constituents to give adequate life for relatively non-corrosive conditions, because the temperature following the quenching action will be relatively low.

The quench vessel 15 is constructed with internal baffles (not shown) and other arrangement for causing the hot gases coming from the generator 11 to be quenched in a water bath 17. Such internal structure forms no part, per se, of the invention. A typical arrangement may be like that mentioned in the foregoing Guptill U.S. Pat. No. 3,232,727, i.e. quench apparatus as described in U.S. Pat. No. 2,896,927 to Nagle and Eastman. However, in accordance with this invention, the quench vessel may be constructed using material of a minimum thickness because it need only withstand the differential pressure between the quench vessel 15 and the container 16. Such differential pressure will be in the order of twenty pounds per square inch.

Quench vessel 15 has a fluid flow line 20 that is connected at the bottom of the vessel 15 for drawing off the carbon-in-water slurry in bath 17, as indicated above.

Near the upper part of the vessel 15 there is an outlet conduit, or pipe 22 that is entirely contained inside of the pressure container 16. This conduit 22 carries the output of synthesis gas from the quench vessel 15, and it has an orifice scrubber 23 attached therein. The scrubber is located near the outlet end thereof.

There is a water inlet line 24 that connects to the scrubber 23, as schematically indicated. This introduces a water spray at the orifice (within the scrubber) so that the cooled synthesis gas is scrubbed as it exits into the interior of container 16. Scrubber 23 may be a conventional item which forms no part, per se, of the invention. It removes additional entrained carbon from the cooled synthesis gas, as the latter is discharged into the interior of the container 16 above the level of a water bath 28 that is maintained therein. There is a pipe 29 at the bottom of the container 16 which has a valve 30 connected thereto for controlling the removal of the water bath 28, as desired.

There is an entrainment eliminator 33 that is connected at the outlet for the synthesis gas from the container 16. Thereafter, there is a flow line 34 that is connected to the top of the entrainment element 33 for carrying away the synthesis gas. Line 34 will lead to the rest of the process, or if necessary, it will lead to a second stage of carbon scrubbing.

It will be particularly noted that the quench vessel 15 may be constructed of thin walled material as has been pointed out above. The pressure differential between its interior and its exterior need only be on the order of 20 pounds per square inch. This is because the outer pressure container 16 is constructed of adequately thick material to withstand the high pressure conditions in the process. Such pressure may be upwards of the range of 1,200 to 3,500 pounds per square inch.

The quench vessel 15 is preferably constructed of high alloy steel such that is can withstand the corrosive properties of synthesis gas fluids having a pH in the range of about 3 to 9. By reason of the low pressure differential, this high alloy steel may have a minimum thickness. For this reason, the cost thereof will be greatly reduced.

While the geometric shape of the container 16 might be something other than spherical, it is preferred to employ the spherical shape because this provides optimum pressure strength. In other words, the thickness can be kept to about half that required if some other geometric shapes were employed. For example, for a given pressure the thickness of a cylindrical shape must be about twice that of a spherical shape.

It is to be expected that the choice of steel to be used for the spherical container 16 might be in accordance with Nelson's curves. In this regard, the use of the outer container 16 enables the addition of neutralizing agents with minimum adverse effects on carbon settling in the decanter. Therefore, it is clear that the thick walled container may be constructed of a low alloy steel which will reduce the cost of the container to a minimum.

It will also be noted that by reason of having the quench vessel contained inside of the pressure container, there is sufficient interior space to accommodate the orifice scrubber with a short and direct connection to the outlet of the quench vessel. The result is the elimination of a substantial amount of expensive piping and concomitant expansion problems. Also, at least a substantial portion of formerly needed scrubbing elements may be eliminated.

While a particular embodiment of the invention has been described above in considerable detail in accordance with the applicable statutes, this is not to be taken as in any way limiting the invention but merely as being descriptive thereof.

I claim:

1. Apparatus for use in a high pressure synthesis gas process including apparatus for quenching said synthesis gas, the improvement comprising in combination an enclosed thin walled quench vessel for receiving and quenching said high pressure gas, a gas outlet from said quench vessel including a water scrubber therein, and a thick walled container enclosing said gas outlet and water scrubber and said quench vessel and containing most of said high pressure therein.

2. The invention according to claim 1 wherein said thin walled quench vessel is constructed of a high corrosion resistant metal, and wherein said thick walled container is constructed of a low alloy steel.

3. The invention according to claim 2 wherein said thin walled quench vessel is constructed of a high alloy steel for withstanding high temperature fluids having a pH in the range of about 3 to 9.

4. The invention according to claim 3 wherein said thick walled container is spherical.

5. Apparatus for use in a high pressure synthesis gas process wherein high temperatures in the range of about 1,800° to 3,500° F. and high pressures of about 1,200 to 3,500 pounds per square inch are involved, said process including apparatus for quenching said synthesis gas, the improvement comprising in combination a thin walled quench vessel for receiving and quenching said synthesis gas, said quench vessel being constructed of a high alloy steel for withstanding said synthesis gas fluids having a pH in the range of about 3 to 9, a thick walled container surrounding said quench vessel, said container being spherical and being constructed of a low alloy steel selected for withstanding substantially all of said high pressure, and a gas outlet from said quench vessel including a water scrubber therein, said outlet and scrubber being contained inside of said container.

6. The invention according to claim 1, further comprising means for suspending said thin walled quench vessel spaced from the inside walls of said thick walled container.

7. The invention according to claim 5, further comprising means for suspending said thin walled quench vessel spaced from the inside walls of said thick walled container.

8. The invention according to claim 7, wherein said thin walled quench vessel is enclosed.

* * * * *